(12) United States Patent
Eberhardt et al.

(10) Patent No.: US 6,901,772 B1
(45) Date of Patent: Jun. 7, 2005

(54) METHOD FOR PRODUCING A GAS DISCHARGE LAMP

(75) Inventors: Angela Eberhardt, Augsburg (DE); Michael Ilmer, Rott am Inn (DE); Michael Seibold, Munich (DE)

(73) Assignee: Patent-Treuhand-Gesellschaft für Elektrische Glühlampen mbH, Munich (DE)

( * ) Notice: Subject to any disclaimer, the term of this patent is extended or adjusted under 35 U.S.C. 154(b) by 390 days.

(21) Appl. No.: 10/048,324

(22) PCT Filed: Jul. 28, 2000

(86) PCT No.: PCT/DE00/02498

§ 371 (c)(1),
(2), (4) Date: Jun. 3, 2002

(87) PCT Pub. No.: WO01/11652

PCT Pub. Date: Feb. 15, 2001

(30) Foreign Application Priority Data

Aug. 5, 1999 (DE) .................................. 199 36 863

(51) Int. Cl.⁷ ............................................. C03B 23/20
(52) U.S. Cl. ............................................. 65/34; 65/36
(58) Field of Search ............................. 65/17.3, 33.1, 65/33.2, 34, 36, 42, 43; 445/1, 53; 313/495, 313/586, 587

(56) References Cited

U.S. PATENT DOCUMENTS

| 3,120,433 A | * | 2/1964 | Van Zee ........................ 65/43 |
| 4,125,390 A | * | 11/1978 | Kawai et al. .................... 65/34 |
| 4,428,764 A | * | 1/1984 | Snitzer et al. ................... 65/31 |
| 4,805,009 A | * | 2/1989 | Pryor et al. .................. 257/729 |
| 5,489,321 A | * | 2/1996 | Tracy et al. .................... 65/43 |
| 5,693,111 A | * | 12/1997 | Kadowaki et al. .............. 65/43 |
| 5,720,640 A | * | 2/1998 | Lu et al. ........................ 445/24 |
| 5,754,003 A | * | 5/1998 | Murai et al. ................. 313/582 |
| 5,827,102 A | * | 10/1998 | Watkins et al. ............... 445/25 |
| 6,030,267 A | * | 2/2000 | Browning ..................... 445/25 |
| 6,517,403 B1 | * | 2/2003 | Cooper et al. ................ 445/25 |
| 6,628,066 B1 | * | 9/2003 | Eberhardt et al. ........... 313/495 |
| 6,659,828 B1 | * | 12/2003 | Seibold et al. ................ 445/25 |

FOREIGN PATENT DOCUMENTS

| FR | 2781308 | * | 1/2000 | ........... H01J 17/49 |
| WO | 98/26440 | * | 6/1998 | ............. H01J 9/26 |

* cited by examiner

Primary Examiner—Steven P. Griffin
Assistant Examiner—Carlos Lopez
(74) Attorney, Agent, or Firm—Robert F. Clark

(57) ABSTRACT

A method for producing containers for gas discharge lamps, which consists in melting glass by incident light radiation.

6 Claims, 3 Drawing Sheets

METHOD FOR PRODUCING A GAS DISCHARGE LAMP

The invention relates to a method for producing a discharge vessel of a gas discharge lamp.

In particular, the invention is aimed at producing gas discharge lamps that are designed for dielectrically impeded discharges, and thus in the case of which at least one polarity of electrodes is separated by a dielectric layer from the discharge volume in the discharge vessel.

With the aid of preferred refinements, the invention is aimed at, moreover, the production of flat radiator lamps—in particular for dielectrically impeded discharges. The technology of gas discharge lamps, in particular of gas discharge lamps for dielectrically impeded discharges and, in turn, in particular, of flat radiator gas discharge lamps, is assumed here as prior art. As an example, reference is made in addition to the prior German patent application 197 11 890.9 by the same applicant, the disclosure content of which with regard to the lamp technology of flat radiator gas discharge lamps for dielectrically impeded discharges is hereby incorporated by reference.

The invention is based on the above-named technical problem of specifying an improved method for producing discharge vessels of gas discharge lamps.

The preamble of claim 1 forms the basis of DE-A 197 11 892 A1, which shows a flat radiator designed for dielectrically impeded discharges, in the case of which radiator two plates of the discharge vessel are interconnected in a gastight fashion at the edge.

The prior art also includes WO98/26440, which discloses a method for producing plasma displays. There, cover plates of a display housing are laid on spacing elements and fastened. A very narrow interspace remains open in this case, and is sealed after evacuation. Illustrated in this case is a technique in which irradiation with light softens glass material to such an extent that the surface tension leads to rounding with the aid of which the said narrow interspace is bridged and sealed.

U.S. Pat. No. 5,693,111 further discloses a method for producing plasma displays in the case of which gastight connections between plates and display housing frames are produced by laser irradiation.

Finally, DE-A 27 18 273 shows a method for producing a vacuum object in the case of which housing parts are bonded together in order then to be fastened to one another in a gastight fashion by irradiation with light and fusing of glass parts.

The above-named technical problem is solved according to the invention by a method for producing a discharge lamp that has a flat radiator discharge vessel with a base plate, a frame and a cover plate, characterized in that glass is fused by irradiation with light in order to form a tight connection between two glass parts of the discharge vessel and/or a tight sealing of an opening of the discharge vessel, spacing elements holding the plates so far apart from one another before the sealing of the discharge vessel that an interspace exists as filling opening between the frame and one of the plates, the spacing elements being softened in order to bring the plates closer and to close the interspace, and a sealing surface arranged in the region of the closed interspace being sealed by irradiation with light.

Preferred refinements of the invention are the subject matter of the dependent claims.

Part of the invention consists in fusing glass by irradiation with light when producing the discharge vessel. The fused glass can serve in this case to connect the parts of the discharge vessel which for this purpose are to consist at least essentially of glass at least in the relevant region. At the same time, the fused glass can also serve to seal a filling opening remaining in the discharge vessel for the purpose of (pumping out and) filling with the discharge gas atmosphere, or an opening serving other purposes. The sealing of an opening is also possible without connecting parts of the discharge vessel by having the fused glass seal a filling opening in a part of the discharge vessel.

In any case, the irradiation with light must result in fusing to such an extent that the softening of the glass leads to a permanent connection and, if appropriate, to a matching of the shape to the neighboring parts of the discharge vessel. The term fusing does not necessarily signify a transition into a phase that is liquid in the actual meaning of the word. Rather, it also includes a sufficient softening which leads, on the one hand, to a sufficient adhesion of the softened material to the neighboring parts of the discharge vessel and, if required, to a matching of shape.

Conventionally, in the production of discharge vessels glass fusing steps have typically been carried out by heating in a furnace or else by direct contact with a flame.

The advantage resides in that irradiation with light offers a possibility of coupling energy in more quickly and directly and, if required, also in a directed fashion. Since no contact with a hot medium is required for heating by means of irradiation with light, it is also possible in this case to work in a very clean gas atmosphere or in a vacuum, without correspondingly having to accept disadvantages for coupling heat to the discharge vessel.

A further measure according to the invention is aimed at spacing elements, provided in addition to the frame, between the two plates, which hold the plates so far apart from one another before the sealing of the discharge vessel that a filling opening results between the frame and one of the plates. When the spacing elements are softened, optionally by irradiation with light, the upper one of the two plates sinks down, thereby closing the filling opening. The sealing section arising from the disappearance of the filling opening can then, in turn, be sealed by irradiation with light.

In accordance with a preferred refinement of the invention, the irradiation with light is performed in a locally concentrated fashion. This means that the irradiation with light is substantially limited to the local region of the glass to be fused, at least within the framework of the optical possibilities, such that a relatively large portion of the remainder, that is not to be fused, of the discharge vessel is not directly affected by heat being coupled in.

The possibility thereby exists of achieving substantially higher temperatures at the sites covered by the locally concentrated irradiation with light than in the remainder of the discharge vessel. Firstly, it is possible thereby to suppress or limit to a substantially smaller part the outgassings, occurring at higher temperatures, from the materials of the discharge vessel, at least for the part that is not affected by the irradiation with light.

Furthermore, the thermal loading of the unaffected parts of the discharge vessel is reduced, it thereby being possible to avoid mechanical damage owing to stresses or thermal changes in the material.

In particular, it is possible at sites of the discharge vessel that are remote from the region covered by the irradiation with light to use materials which have a low thermal resistance, in particular a lower melting point than the glass to be fused. For example, this goes for what are termed solder glasses, which are used, for example, in joining different parts of discharge vessels of flat radiators and, in addition to intense outgassing, also exhibit relatively low melting points. Other examples for temperature-sensitive components are metal electrodes or line bushings and, finally, all regions in which materials with different coefficients of thermal expansion meet one another.

On the other hand, the localizability of the irradiation with light permits the use of glasses even with high softening temperatures for the purpose of joining glass parts or sealing filling openings and the like, for example even with softening temperatures of 700° C. and above. A typical temperature range for the fusing according to the invention is between 350 and 1000° C. In this case, the invention can, of course, also be advantageous in lower temperature ranges, in particular even in conjunction with glasses that soften at low temperatures, for example if the aim is to limit in vacuum an outgassing of solder glass materials that is already substantial starting from 400°–500° C.

Precisely with regard to the possibility even of fusing types of glass that do not soften until relatively high temperatures, the invention is preferably aimed at those glasses which outgas as little as possible even in the event of heating.

These are preferably nonporous and binder-free glasses by contrast with pulverulent solder glasses. To this extent, the method according to the invention further improves the purity of the discharge gas in that not even the region fused by the irradiation with light shows excessive out gassing.

A further preferred measure of the invention consists in selecting the glass to be fused such that it absorbs more strongly in the irradiated spectral region than do the neighboring parts of the discharge vessel. It is thereby possible to achieve a localization of the heating by amplified power absorption in the desired glass material independently of optical measures. For one thing, the irradiated total light power can be reduced in conjunction with strong absorption of the glass to be fused. Furthermore, there is a consequent increase, if appropriate in addition to the previously described measures for local concentration, in the achievable temperature difference between the glass to be fused and the remainder of the discharge vessel—with the advantages previously represented.

In addition to a suitable choice of the actual types of glass, such a selective absorption of the irradiated light can also be produced by special additives. Preference is given in this case to metal ions such as ions of Co, Cu, Cr, Ni, Ce, Nd, Pr, Cd, Ti, Mn, V, Pb, Zn, Bi or Fe, in particular Fe ions. Also preferred are sulfides, tellurides or selenides of Zn, Sb, Pb, Mo, W, Ag, Co, Cu, Cr, Ni, Ce, Nd, Pr, Cd, Ti, Mn, V or Fe, in particular FeS.

The glass provided with these additives absorbs particularly strongly in the infrared region. Consequently, an infrared radiation is preferred for the invention. The infrared light or other light can be produced by a conventional light source that can be focused by conventional optical means and directed onto the region to be illuminated, for example by mirrors, diaphragms and the like. However, use is preferably made of a laser. A YAG laser comes into consideration, in particular. In order to irradiate regions that are extended (possibly linearly), as an alternative to conventional optical measures the irradiation spot of the laser can also be moved along the region to be illuminated, for example by mirror movements or movements of an optical conductor system. In this case, the region to be irradiated need not be continuous. It is also possible in a similar way to irradiate a plurality of sites distributed along the discharge vessel.

So far, stress has been laid on the importance of the most pronounced selectivity possible for the power absorption in the region of the glass to be fused. Low temperatures of the discharge vessel were fundamentally regarded in this case as favorable. However, it is to be added to this that for the purpose of desorbing adsorbates, in particular water, located on the inner walls of the discharge vessel, it is to be recommended to carry out thermal desorption before introducing the filling gas and subsequently sealing the discharge vessel by temperatures of at least above 150° or 200° C.

Furthermore, it can also be worth recommending increasing the temperature of the discharge vessel if excessive thermal stresses are to be expected because of the strong local heating by the irradiation with light. For this reason, before the local irradiation with light, during the same and immediately thereafter the discharge vessel is kept at a slightly raised temperature. According to the invention, temperatures of above 150, preferably above 200 and, in the most favorable case, above 250° C. come into consideration here. Favorable upper limits are 500° C., preferably 450, 400 and, in the best case, 350° C. This step can be combined with the previously mentioned thermal desorption, or can be provided in the cooling phase after such a desorption. The upper temperature limits are conditioned by the fact that the outgassing processes to be avoided increase at higher temperatures.

With regard to the device suitable for such method steps, the invention is further aimed at carrying out the method in a vacuum furnace for the purpose of pumping out and filling in conjunction with a temperature that is raised in a controlled fashion. An infrared-transparent window or a bushing for an optical conductor can be used in this case for the laser as heating light source for fusing the glass.

As already mentioned at the beginning, the fusing of glass according to the invention when producing a discharge vessel is suitable, on the one hand, for assembling parts of the discharge vessel ("joining") or, on the other hand, also for sealing openings, in particular filling openings, in the discharge vessel. Such an opening can be a filling opening for pumping out and filling, which has to be sealed after the filling. However, it can also be an opening through which, for example, an electrical bushing is laid and which is to be tightly sealed, the aim being to seal the bushing in. In each case, it is favorable to provide the glass to be fused as sealing element as a thickened rim of the opening. As it softens, the glass can then seal the opening uniformly from all sides of the opening. If the opening is a filling opening, the diameter of the opening can be 1–5 mm, for example.

As already mentioned at the beginning, the invention is preferably aimed at flat radiator discharge vessels. These can be constructed from a base plate and a cover plate as well as a frame connecting the two plates. A favorable arrangement of a filling opening can be situated in the frame in this case, because the light emission is particularly little impaired thereby. This also holds, moreover, for electrical bushings.

Also possible, however, are arrangements in the base plate or in the cover plate, in which case preference is to be given to a skilful accommodation in an edge region, in order not to disturb the light emission and the course of the discharge electrodes. In particular, in the case of very flat lamps the frame can also consist simply of a solder glass strand.

A combined case, in which, on the one hand, a filling opening is sealed and, on the other hand, glass parts of the discharge vessel are tightly connected, forms a further aspect of the invention, in accordance with which in the case of a flat radiator discharge vessel a filling opening that is removed by being fused is present between the frame and one of the plates. For this purpose, a sealing surface between one of the plates and the frame has unevennesses which are either removed by the irradiation with light and the softening of the glass, or to which the softened glass is matched.

A variant of this consists in that the sealing surface has a multiplicity of small unevenesses, being corrugated, for example. If the corrugated part, for example the frame or a part of the frame, consists of the, preferably infrared-absorbing, glass to be fused, the corrugation can be smoothed by irradiation with light, and the plate can be connected to the corrugated surface of the frame by the simultaneous softening. Of course, the glass softening can also have the effect of matching the glass to a corrugated surface of a part that does not soften and thereby connecting it thereto.

Alternatively, the unevenesses can comprise a few elevations at salient points, one raised point sufficing in principle.

Furthermore, it is also possible to use an absorbing support on the frame, and to produce the frame from a material that is optimized using other criteria.

Since the possibilities described for connecting the frame to one plate is associated with a macroscopic movement between these two parts, a stop can be advantageous in this case. Since it is generally easier to irradiate light onto the sealing surface between the uppermost of the two plates and the frame, it is particularly preferred to provide a stop for a moving plate situated on top. It is to be borne in mind in this case that this plate can by no means be situated on top in the operating state of the lamp.

Furthermore, the plate can be inclined toward the stop such that in the event of any slippage gravity will cause it to slip in the direction of the stop.

The spacing elements according to the invention that are mentioned further above can be of multipartite design, only a part of each spacing element, an intermediate element, being softened during production. In particular, the intermediate element can be a cushion below or above a spacing element which softens at lower temperatures than does the remainder of the spacing element.

In order to take up the last mechanical displacements during sealing of the discharge vessel, that is to say when the frame is being tightly connected to one plate, it can be advantageous during the irradiation with light onto the sealing surface to leave the discharge vessel still at a somewhat higher temperature at which the spacing elements are somewhat soft. Again, during sealing of the discharge vessel the spacing elements can be somewhat softened (again) by a further irradiation with light, in order to equalize the last stresses.

Conventionally, glass discharge vessels, in any case those for flat radiator lamps, are joined with solder glass from a plurality of parts before filling and heated in the furnace. If the invention is used only in a last step of using glass parts of the discharge vessel, for example in conjunction with the possibilities that had been treated of simultaneously sealing a filling opening, or else only for sealing a filling opening in one of the parts, a method step can be carried out in a first continuous furnace before the step of irradiation with light. In this case, the outgassings from the solder glass that are associated with the raised temperatures cannot yet lead to contamination of the discharge vessel. At the same time, adsorbates can already be desorbed. The discharge vessel, that has preferably cooled down somewhat, can thereupon be pumped out further and then filled with the filling gas. The discharge vessel is sealed thereafter in one of the ways described. In a further second continuous furnace, the already sealed discharge vessel can then be cooled down in a controlled way by lowering the temperature under control.

The invention is explained below in more concrete terms with the aid of a plurality of exemplary embodiments, it being possible for the features disclosed thereby also to be essential for the invention individually or in other combinations than those represented. In the drawing.

In the first two exemplary embodiments of the invention illustrated in FIGS. 1–5, a filling opening in a discharge vessel is sealed by fusing with the aid of a glass sealing element. According to the first exemplary embodiment, the sealing element can be arranged in one of the plates, while according to the second it can be arranged in the frame of a flat radiator discharge vessel.

Figure 1:
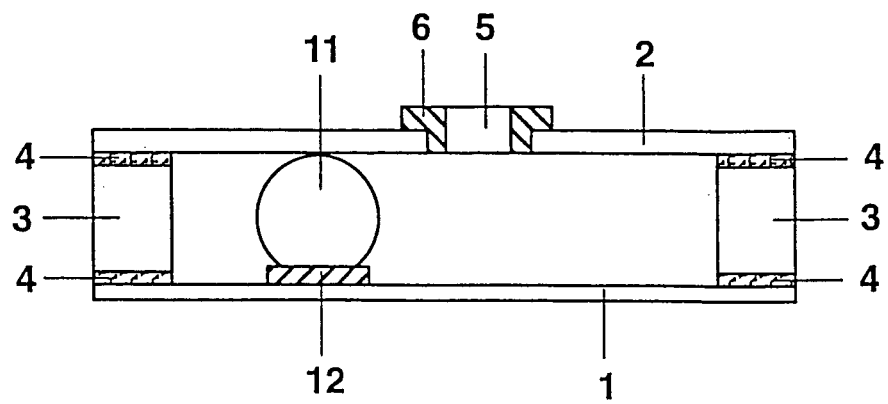
FIG. 1 shows a schematic cross sectional view through a flat radiator discharge vessel before sealing according to the invention in accordance with a first exemplary embodiment according to the invention.
Figure 2:
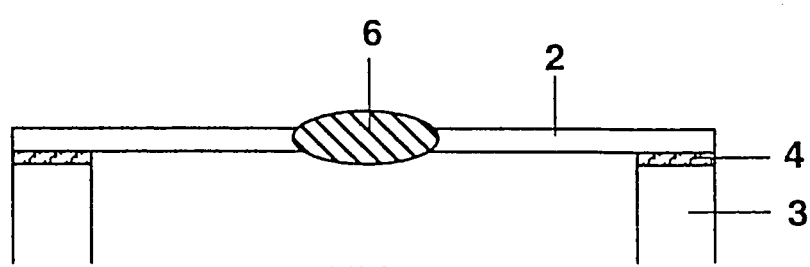
FIG. 2 shows an illustration of a detail from FIG. 1, with a sealed filling opening.

FIG. 1 shows a schematic cross section through a flat radiator discharge vessel. In this case, the numeral 1 denotes a base plate and the numeral 2 a cover plate, while the numeral 3 denotes a frame that connects the two plates. These components consist of glass and have been interconnected in a preceding joining method step via a solder glass layer denoted by 4. The resulting discharge vessel has a substantially rectangular cross section and (not illustrated) a rectangular plan view. It serves to produce a flat radiator with dielectrically impeded discharges for background illumination of a flat display screen, or else for normal lighting. In accordance therewith, electrode strips are printed on inside the frame 3 on the side of the base plate 1 situated on top in the figure, a portion of the electrodes being covered with a dielectric layer. These details are of no further interest here and are therefore not illustrated. Reference is made to the disclosure content of the already cited application 197 11 890.0.

In any case, the presence of electrode strips on the base plate 1 is the reason for the arrangement of a filling opening 5 in the cover plate 2. In this case, for the sake of simplicity the filling opening 5 in FIG. 1 is situated essentially in the middle; however, for reasons already explained an edge position is preferred in a concrete embodiment.

A glass sleeve 6 is inserted as sealing element into the filling opening 5 in the form of a thickened collar. The sealing element 6 consists of a glass colored brown by FeS that is strongly absorbing in the infrared. According to the invention, this sealing element 6 is irradiated with the aid of a YAG laser emitting in the infrared region, in the process of which it is heated to temperatures above 700°, softens and is drawn into the filling opening 5 as drops by the surface tension. After cooling, the filling opening 5 is sealed in the manner illustrated schematically in FIG. 2, the heating of the sealing element 5 not impairing the remainder of the discharge vessel. It is indicated in the drawing that the sealing element 6 that seals the filling opening 5 produces a slight corrugation with respect to the remainder of the cover plate 2, and is, however, colored brown in an optically detectable fashion. The already mentioned arrangement near the wall is to be preferred for this reason.

Figure 3:
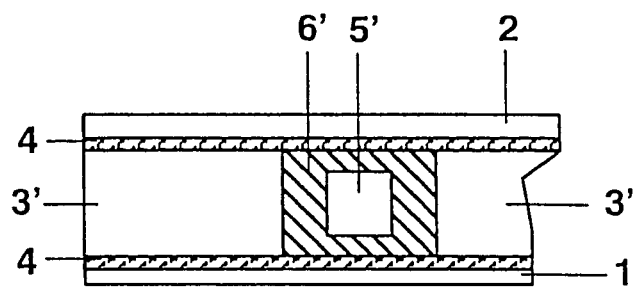
FIG. 3 shows an illustration of a detail with an alternative filling opening in relation to FIG. 1 before sealing in accordance with a second exemplary embodiment according to the invention.
Figure 4:
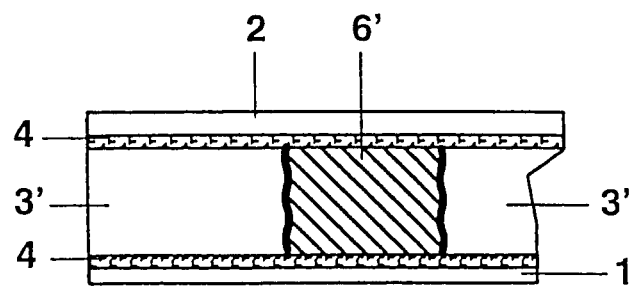
FIG. 4 shows the exemplary embodiment from FIG. 3 after the sealing.

An alternative to this is shown in FIGS. 3 and 4, the as yet unsealed state of a filling opening 5 being illustrated in FIG. 3, and the sealed state in FIG. 4. In accordance with FIG. 3, a filling opening 5' is provided in a frame 3', the frame 3' therefore having a gap. In a way similar to that illustrated in FIG. 1, a collar sleeve 6', which corresponds otherwise to the above explanations relating to FIG. 1, is inserted into the filling opening 5'.

After irradiation by the YAG laser, the filling opening 5' is sealed by the fused sealing element 6', as illustrated in FIG. 4. This variant offers an impairment of the light emitting properties of the gas discharge lamp which is as small as possible.

Figure 5:
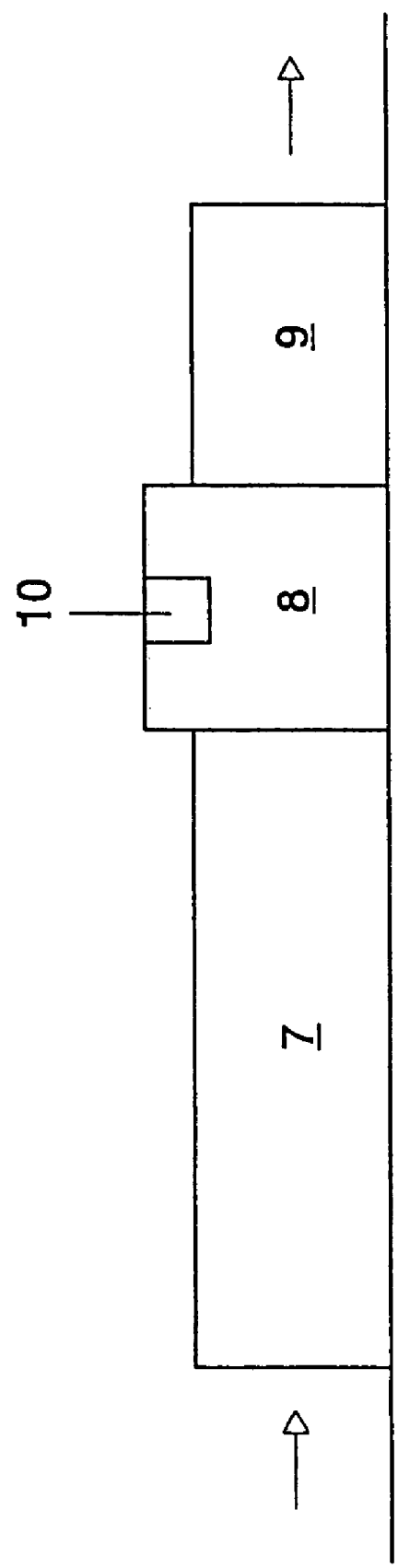
FIG. 5 shows a schematic representation of a production line for the method according to the invention.

In accordance with FIG. 5, the part of the production method according to the invention is performed in a schematically illustrated production line composed of three stations 7, 8 and 9. As is illustrated by the arrow drawn in on the left in FIG. 5, a structure assembled from the base plate 1, the cover plate 2, the frame 3 and the sealing element 6 and: provided with solder glass 4 at the suitable sites is introduced into the first station 7, a continuous furnace for the purpose of joining these semi-finished products. The discharge vessel is joined in the furnace by heating to a temperature of between 400° and 520° C. A protective gas atmosphere is present in the continuous furnace in this case. The contaminants, in particular binders from the solder glass 4, that emerge at the raised temperatures are expelled by thorough rinsing.

The temperature in the continuous furnace 7 is raised so far that the solder glass 4 softens at a viscosity of the joining solder of substantially less than $10^6$ dPas, and connects the parts to be joined. This typically requires temperatures of 520° C. The protective gas atmosphere serves essentially to prevent oxidation of the luminescent material (not illustrated in the figures) in the discharge vessel at the raised temperatures. A vacuum furnace (substantially more complicated, and therefore more expensive) is not required in station 7.

After the joining and cooling to a temperature with a viscosity of the solder glass 4 of above $10^{10}$ dPas, the discharge vessel is introduced into the second station 8, the sealing element 6 still corresponding to the state illustrated in FIGS. 1 and 3. Consequently, the interior of the discharge vessel is still open above the filling opening 5. Pumping off is therefore performed in the vacuum furnace 8 through the filling opening 5, the discharge vessel being kept at a raised temperature of 250°–300° C. suitable for supporting further desorption processes and with regard to the in the case of the following sealing of the sealing element 6.

Alternatively, the sealing element 6 can also not be applied until in the vacuum furnace 8.

An atmosphere corresponding to the desired gas filling of the gas discharge lamp is set up in the vacuum furnace 8 after it has been sufficiently pumped out, and penetrates into the discharge vessel through the filling opening 5.

A coupling device, illustrated schematically and denoted by 10, with an optical conductor bushing for a YAG laser arranged outside the furnace 8 can now be used to launch power into the sealing element 6 in a pinpointed fashion until said element fuses at a temperature of over 500° C., more typically 700° C., and is drawn into the filling opening 5 as drops by the surface tension. After the laser 10 has been shut down, the sealing element 6 cools in the shape illustrated in FIGS. 2 and 4 and encloses the gas filling enclosed in the discharge vessel.

The closed discharge vessel is then introduced into the third station 9, a further continuous furnace, and cooled to approximately 50° C. there by a defined control of the furnace temperature or by moving the lamp along a section, corresponding to a defined temperature profile, inside the continuous furnace 9. The finished discharge vessel can be removed thereafter in accordance with the arrow drawn in on the right in FIG. 5. Since, as already mentioned, it is a discharge vessel provided with electrode strips and bushings of the same (compare the already cited application 197 11 890.9) that is involved, the gas discharge lamp is thereby essentially finished.

A further aspect of the production method relates to the glass sphere 11, drawn schematically in FIG. 1, as spacing element which rests on an "intermediate element" 12 made from solder glass. Of course, a plurality of these spacing elements 11 are provided. These are support bodies for providing mutual support to the plates 1 and 2 against the external pressure when the discharge vessel has underpressurized gas fills. Reference may be made for this purpose to application 198 17 478.0 from the same applicant. The aim of the arrangement of these spacing elements 11 on the solder glass cushions 12 is that in the as yet unjoined state, that is to say before insertion into the first continuous furnace 7, the spacing elements hold the cover plate 2 high beyond the frame 3. Consequently, it is firstly possible during joining to achieve a better pump cross section for rinsing the interior of the discharge vessel and expelling the binder and other contaminants. In particular, however, it is ensured thereby that after the cover plate 2 is caused to sink down onto the frame 3 or the upper solder glass layer 4 thereof by the softening of the solder glass 12 and by the weight of the cover plate 2, all the support elements 11 bear uniformly against the cover plate 2. What is involved is therefore a selfadjusting action with regard to the dimensional accuracy of the support elements between the plates 1 and 2. In the following description of a further exemplary embodiment, it becomes clear in what way such spacing elements can be associated with the invention.

Figure 6:
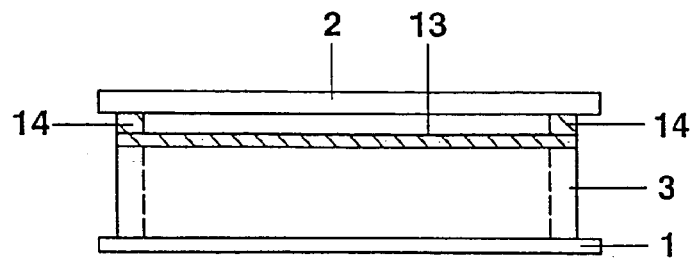
FIG. 6 shows a schematic side view of a flat radiator discharge vessel before the sealing according to the invention in accordance with a third exemplary embodiment according to the invention.

The third example in FIG. 6, which would be an exemplary embodiment only in conjunction with spacing elements in accordance with FIG. 1, has, in turn, a base plate 1 and cover plate 2 and a frame 3. The frame 3 can be connected in various ways to the base plate 11, or be designed in one piece with it. In particular, it could also be joined to the base plate 1 by fusing glass as a consequence of irradiation with light. However, the exemplary embodiment serves the purpose of illustrating the connection of the cover plate 2 to the frame 3. For this purpose, an infrared-absorbing glass support with a top side 13 is laid onto the frame 3 and is locally raised with the aid of small columns 14 at the corners of the discharge vessel. The cover plate 2 is situated in the remaining region at a spacing, corresponding to the height difference between the columns 14 and the remainder of the support 13, above the top side 13 of the support, that is to say the sealing surface.

The columns 14 are softened by localized heating of the columns 14 by irradiation from an infrared laser through the cover plate 2 (which absorbs substantially less than does the glass material of the support with the columns 14), such that the cover plate 2 sinks onto the sealing surface 13 on the support. It is then possible by heating the entire sealing surface 13 appropriately with the aid of infrared irradiation to achieve an intimate sealing of the discharge vessel over the entire upper circumference of the frame 3, that is to say over the entire sealing surface 13.

In this example, columns 14 are provided at all four corners of a flat radiator discharge vessel of rectangular plan view. Four interspaces therefore result between the sealing surface 13 and the cover plate 2, leading in each case to one side of the rectangular plan view. The columns 14 can be adapted in height depending on the requirements made of the power cross section for pumping out and filling the discharge vessel.

Figure 7:
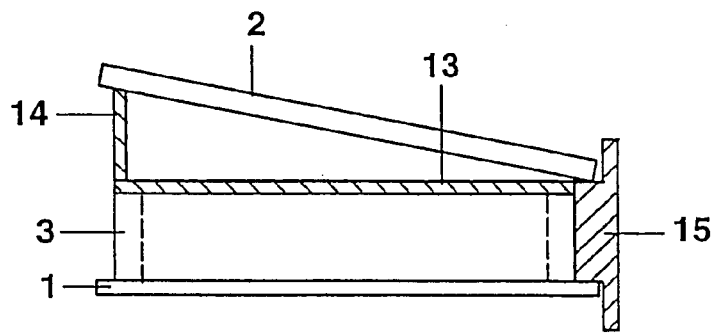
FIG. 7 shows a variant of FIG. 6 according to a fourth exemplary embodiment of the invention.

In the case of excess height, however, there can be the danger of lateral migration of the cover plate 2 when sinking onto the sealing surface 13. The fourth example of FIG. 7 provides a remedy in this regard, which would likewise be an exemplary embodiment only in conjunction with spacing elements. Columns 14 are likewise provided there, but only at two adjacent corners of the rectangular plan view. A stop body 15 is arranged in the case of the production method at the side edge opposite the two corners with the columns 14. Even if, as indicated with exaggeration in the drawing, the height of the columns 14 is considerable, in the case of migration of the cover plate 2 no substantial lateral displacement can occur as the cover plate 2 sinks onto the sealing surface 13. In the case of migration or slipping, gravity will cause the cover plate 2 to strike the stop 15, which will retain said cover plate in the correct position while the column 14 is dismantled. Thus, it is possible thereby to achieve large column heights 14, although the total surface area, achieved in the case of a fixed column height, of the filling openings between the cover plate 2 and sealing surface 13 is halved by comparison with the variant from FIG. 6.

Figure 8:
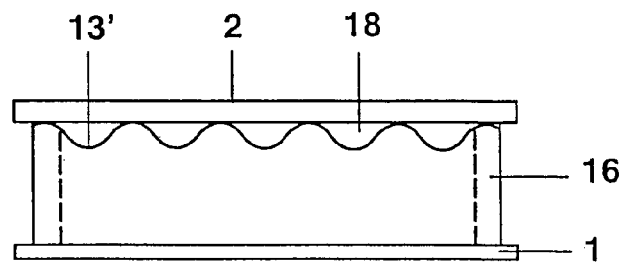
FIG. 8 shows a further variant of FIGS. 6 and 7 according to a fifth exemplary embodiment.

A further fifth example is shown in FIG. 8, which would likewise be an exemplary embodiment only in conjunction with spacing elements. Here, there is a frame 16 between the base plate 1 and the cover plate 2 made from infrared-absorbing glass material (at least in the upper region, in any case). The upper region of the frame 16 and the sealing surface 13' situated thereupon are corrugated such that the cover plate 2 bears against the frame 16 at a relatively large number of sites between which individual openings 18 occur—in a fashion corresponding to the troughs of the corrugation—in each case. Here, as well, softening or fusing of the upper region of the frame 16, particularly in the region of the peaks of the corrugation, causes the cover plate 2 to sink down in a planar fashion onto the sealing surface 13', and thereby seal the discharge vessel.

Of course, it is also possible to provide a support in the sense of the third and fourth example with a corrugated sealing surface 13' and, conversely, it is possible in the case of an example corresponding to FIG. 8 to provide a sealing surface with columns provided at a few salient points, in accordance with the third and fourth example. Moreover, as in the first and second example, spacing elements can also occur in the third, the fourth and the fifth example, although they are not illustrated in FIGS. 6, 7 and 8.

Figure 9:
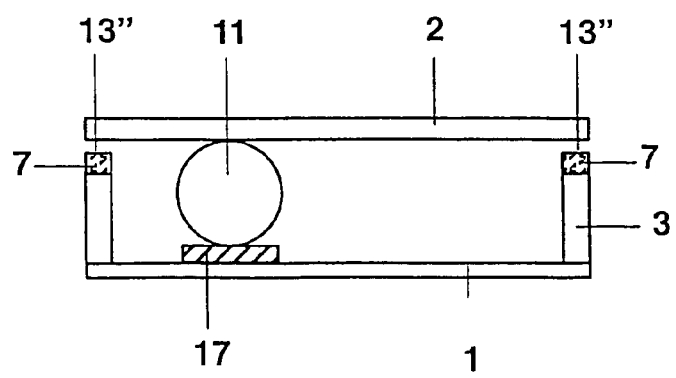
FIG. 9 shows a schematic cross sectional view through a flat radiator discharge vessel according to a sixth exemplary embodiment of the invention.

The last and sixth exemplary embodiment in FIG. 9 uses the spacing elements 11 with special intermediate elements 17 in a way typical of the invention: in this case, the cover plate 2 is situated on the spacing elements 11 before the sealing according to the invention, but not on a sealing surface 13" of the frame. The sealing surface 13" is the top side of an infrared-absorbing support 7 on the actual frame 3. The intermediate elements 17 made from nonporous glass are then softened by laser irradiation with the aid of infrared-absorbing inserts, such that the spacing elements 11, glass spheres in this case as well, sink down with the cover plate 2.

As a result, the cover plate 2 comes to bear against the sealing surface 13" on the support 7, and can thereafter be fused with the latter, in turn, by laser irradiation. Thus, in this exemplary embodiment the element (the intermediate element 17) that is softened by irradiation with light and therefore removes an opening is not identical to the element, specifically the support 7, having the sealing surface 13".

Here, as well, the laser irradiation can be performed through the cover plate 2, for example, because the elements 17 and 7 to be softened absorb selectively.

The sinking down of the cover plate 2 onto the glass spheres 11 that sink into the intermediate elements 17 results in a self-adjusting action such that the cover plate 2 finally rests with a uniform contact pressure on all the glass spheres 11 provided and on the sealing surface 13". Such a self-adjusting function by softening of intermediate elements can, of course, also be provided in the case of the other exemplary embodiments. In particular, the intermediate elements can also be "reheated" after the sealing of the discharge vessel, in order to eliminate stresses that have remained.

The third, fourth, fifth example and sixth exemplary embodiment have in common that the laser irradiation spot is moved on the sealing surface in order to achieve heating over two dimensions. This can be performed most simply by appropriate manipulation of an optical conductor that transports the laser beam. In this way, the laser can be arranged outside the vacuum furnace 8 illustrated in FIG. 5, and use may be made of an manipulating mechanism with appropriate vacuum bushings in conjunction with an optical conductor bushing for the purpose of locally targeted irradiation. It is also possible, by means of a somewhat raised temperature of the overall discharge vessel, to achieve a certain softening of an intermediate element for the purpose of equalizing stresses, consideration being given, however, only to glasses or solder glasses of low melting point. By contrast, the targeted laser irradiation has the advantage of greater freedom in selection of material for the intermediate element 17. It can be advantageous to seal the actual sealing section once again thereupon.

Apart from the details explained of the irradiation with light onto the appropriate elements in the case of the various exemplary embodiments, the production corresponds to the examples and exemplary embodiments illustrated in FIGS. 6–9, or to the explanations relating to FIG. 5.

What is claimed is:

1. A Method for producing a discharge lamp comprising:
   providing a flat radiator discharge vessel having a base plate, a frame, and a cover plate.

2. The method as claimed in claim 1, in which the glass to be fused is nonporous before the irradiation with light.

3. The method as claimed in claim 1, in which a laser produces the irradiation with light, using a vacuum furnace with an optical conductor bushing for the irradiation with light and the discharge vessel is heated in the vacuum furnace during local irradiation with light to a temperature of between 150° C., 200° C. and, or 250° C. as lower limit and 500° C., 450° C., 400° C., or 350° C. as upper limit.

4. The method as claimed in claim 1, in which the glass to be fused contains additives that absorb with regard to the irradiation with light, specifically at least one ion from the group of Co, Cu, Cr, Ni, Ce, Nd, Pr, Cd, Ti, Mn, V, Pb, Zn, Bi and Fe.

5. The method as claimed in claim 4, in which the additives contain sulfides, tellurides or selenides of Zn, Sb, Pb, Mo, W, Ag, Co, Cu: Cr, Ni, Ce, Nd, Pr, Cd, Ti, Mn, V or Fe.

6. The method as claimed in claim 1, in which the discharge vessel has discharge electrodes that are separated at least partially from the interior of the discharge vessel by a dielectric layer.

* * * * *

UNITED STATES PATENT AND TRADEMARK OFFICE
CERTIFICATE OF CORRECTION

PATENT NO. : 6,901,772 B1
APPLICATION NO. : 10/048324
DATED : June 7, 2005
INVENTOR(S) : Eberhardt et al.

It is certified that error appears in the above-identified patent and that said Letters Patent is hereby corrected as shown below:

Column 10, lines 52-54, the text of claim 1 beginning with "1. A Method for producing a discharge lamp comprising:" and ending with "and a cover plate." should read:

--1. A Method for producing a discharge lamp comprising:
providing a flat radiator discharge vessel having a base plate, a frame, and a cover plate; fusing glass, by irradiation with light, to seal an opening of the discharge vessel.--

Signed and Sealed this

Second Day of December, 2008

JON W. DUDAS
*Director of the United States Patent and Trademark Office*